US012729696B2

(12) United States Patent
Key et al.

(10) Patent No.: US 12,729,696 B2
(45) Date of Patent: Sep. 8, 2026

(54) CASING TREATMENT SYSTEM AND METHOD

(71) Applicant: Purdue Research Foundation, West Lafayette, IN (US)

(72) Inventors: Nicole Leanne Key, West Lafayette, IN (US); William Joseph Brown, Lafayette, IN (US); Andrew Curtis Cusator, West Lafayette, IN (US); Yu Ning Dai, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/612,085

(22) Filed: Mar. 21, 2024

(65) Prior Publication Data

US 2024/0328432 A1 Oct. 3, 2024

Related U.S. Application Data

(60) Provisional application No. 63/454,838, filed on Mar. 27, 2023.

(51) Int. Cl.
*F04D 29/42* (2006.01)
*G06F 30/28* (2020.01)
*G06F 119/02* (2020.01)

(52) U.S. Cl.
CPC ......... *F04D 29/4213* (2013.01); *G06F 30/28* (2020.01); *G06F 2119/02* (2020.01)

(58) Field of Classification Search
CPC .. F04D 29/685; F04D 29/526; F04D 27/0207; F04D 27/0223; F04D 29/4213; F04D 27/0215
See application file for complete search history.

(56) References Cited

U.S. PATENT DOCUMENTS

2011/0299979 A1* 12/2011 Montgomery ........ F04D 29/526 415/182.1

FOREIGN PATENT DOCUMENTS

CN 204284005 U * 4/2015 ........... F04D 29/526
CN 104675755 A * 6/2015 ........... F04D 29/541

OTHER PUBLICATIONS

Translation CN-104675755-A (Year: 2025).*
Translation CN-204284005-U (Year: 2025).*
Weichert, S. et al., "Self-Regulating Casing Treatment for Axial Compressor Stability Enhancement." Proceedings of the ASME 2011 Turbo Expo: Turbine Technical Conference and Exposition. vol. 7: Turbomachinery, Parts A, B, and C. Vancouver, British Columbia, Canada. Jun. 6-10, 2011. pp. 225-237. ASME. https://doi.org/10.1115/GT2011-46042.

* cited by examiner

*Primary Examiner* — J. T. Newton
(74) *Attorney, Agent, or Firm* — Purdue Research Foundation

(57) ABSTRACT

The casing treatment system includes a compressor having an injection port, an extraction portion, a recirculation channel. It is also contemplated for the casing treatment system to include a plurality of injection ports, a plurality of extraction ports, and/or a plurality of recirculation channels. The casing treatment system is based on using the differences in the flow field at peak efficiency and near stall to "turn on" the recirculation at near stall operation to extend the stall margin, and to "turn off" the recirculation at peak efficiency operation to minimize impact to efficiency.

19 Claims, 15 Drawing Sheets

θ
z
Extraction
U
Injection

θ
Shroud
Ext. Angle r
z
Shroud
Inj. Angle

CASING TREATMENT SYSTEM AND METHOD

CROSS REFERENCE TO RELATED APPLICATIONS

This application claims the priority benefit of U.S. Provisional Patent application No. 63/454,838, filed Mar. 27, 2023, the contents of which is incorporated herein by reference in its entirety.

GOVERNMENT RIGHTS

This invention was made with government support under N00014-19-1-2561 awarded by the Office of Naval Research. The government has certain rights in the invention.

FIELD

The disclosure generally relates to compressors for gas turbine engines and, more particularly, to casing treatments for compressor systems.

INTRODUCTION

This section provides background information related to the present disclosure which is not necessarily prior art.

A casing treatment is a technology that modifies the compressor flow field to extend the compressor operating range while attempting to have minimal detrimental effect on efficiency. A recirculation channel is a type of casing treatment, where flow is extracted at some location along the rotor shroud and is then re-injected at some location upstream. In known systems, the recirculation channel may increase stall margin but also negatively impacts the efficiency of the compressor.

Accordingly, there is a continuing need for a casing treatment system and a method that may enhance the stall margin while minimally and/or negligibly impacting the efficiency of the compressor.

SUMMARY

In concordance with the instant disclosure, a casing treatment system and method that may enhance the stall margin while minimally impacting the efficiency of the compressor has surprisingly been discovered.

The casing treatment system includes a compressor having an injection port, an extraction portion, a recirculation channel. It is also contemplated for the casing treatment system to include a plurality of injection ports, a plurality of extraction ports, and/or a plurality of recirculation channels. The casing treatment system may be based on using the differences in the flow field at peak efficiency and near stall to "turn on" the recirculation at near stall operation to extend the stall margin, and to "turn off" the recirculation at peak efficiency operation to minimize impact to efficiency. Assuming that the recirculation flow is driven primarily by the pressure difference between the injection location and extraction location, the pressure field near the tip of the rotor at the two different operating conditions were compared.

The casing treatment system may be utilized in various ways. For instance, the casing treatment system may be utilized according to a method. The method may include a step of identifying a rotor shroud static pressure distribution. Next, the method may further include a step of identifying a shroud pressure variation with axial location. Afterwards, the method may include a step of identifying an injection location. Then, an extraction location may be determined. Next, the method may further include a step of optimizing the pitchwise clocking of the injection and extraction locations. One skilled in the art may select other suitable methodologies for producing the casing treatment system, within the scope of the present disclosure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 2A:
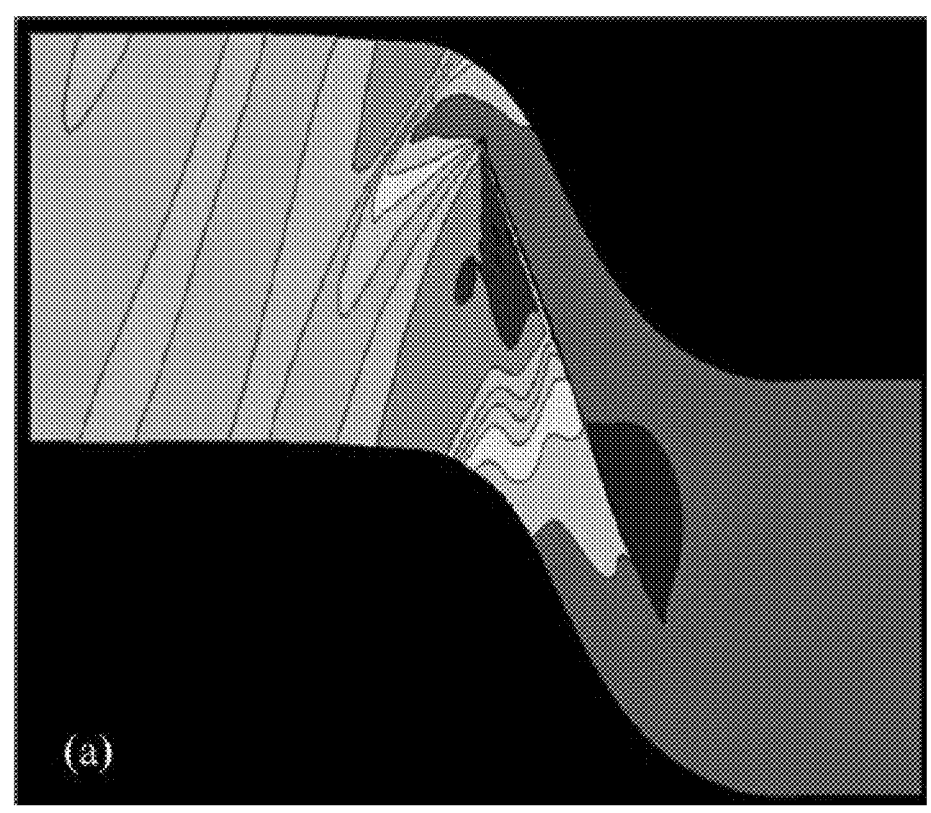
FIG. 2A is a schematic diagram of a static pressure distribution at a rotor shroud from computational fluid dynamics for near stall operation, according to one embodiment of the present disclosure.
Figure 2B:
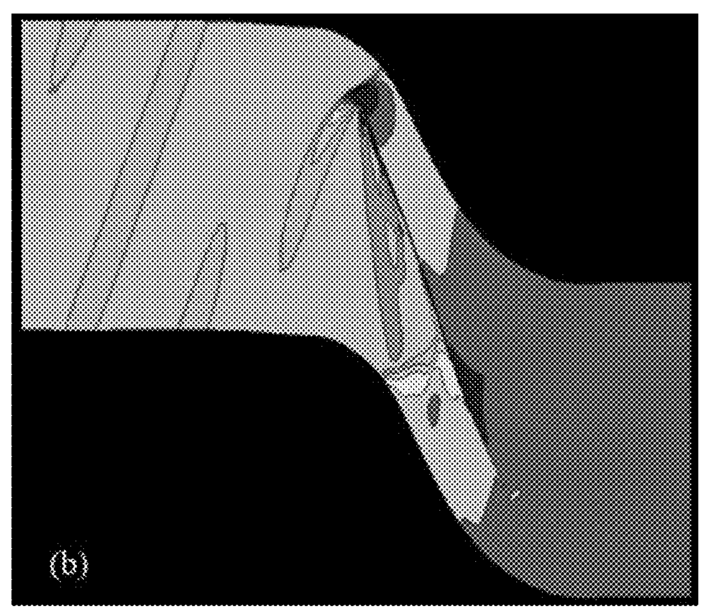
FIG. 2B is a schematic diagram of a static pressure distribution at a rotor shroud from computational fluid dynamics for an operating point at peak efficiency, according to one embodiment of the present disclosure.
Figure 3:
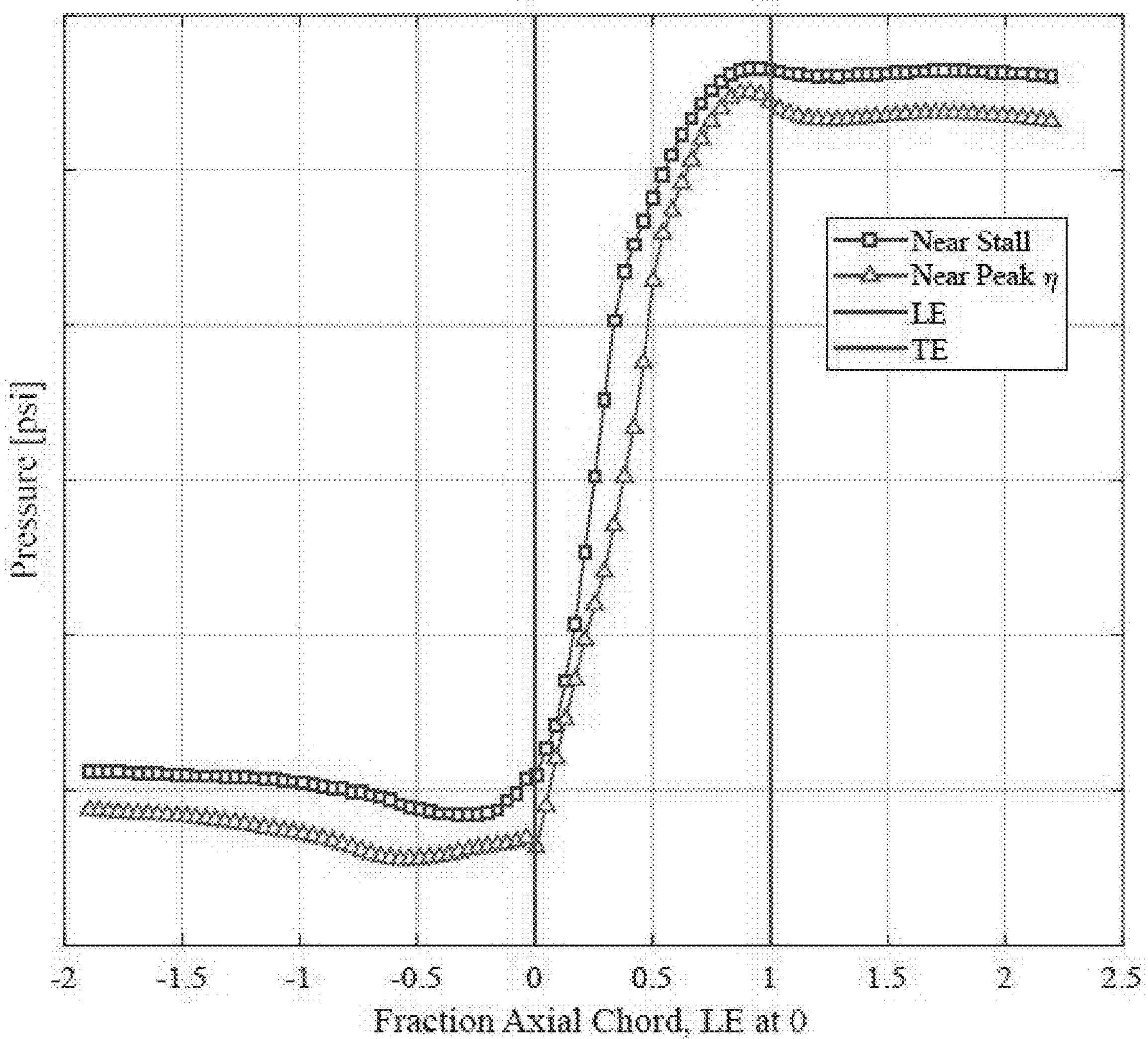
Figure 4A:
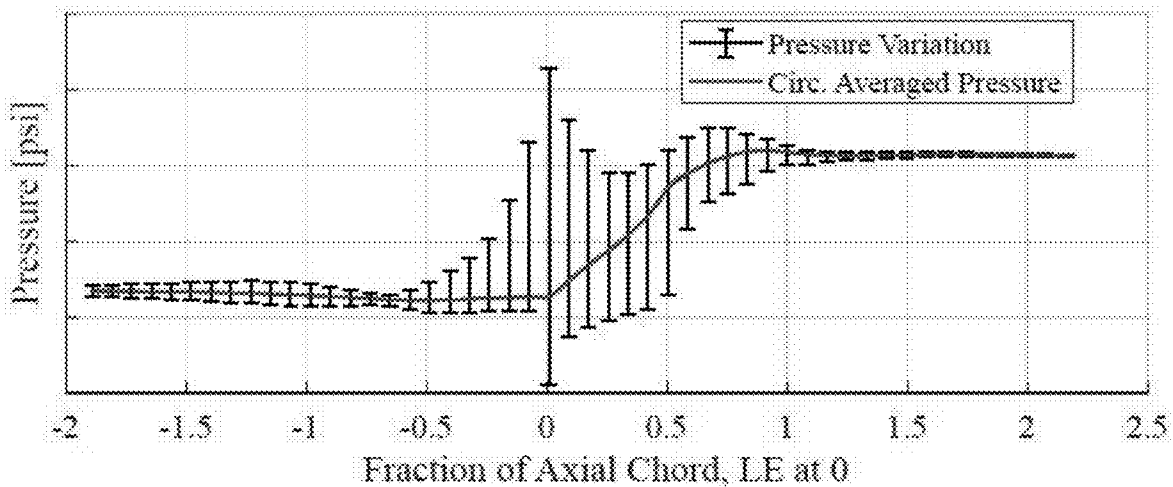
Figure 4B:
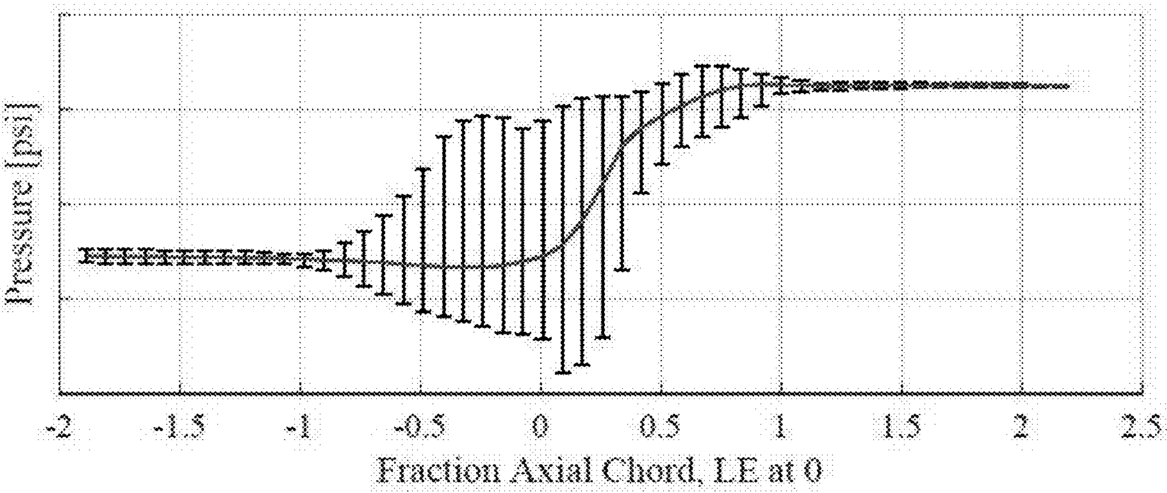
Figure 5:
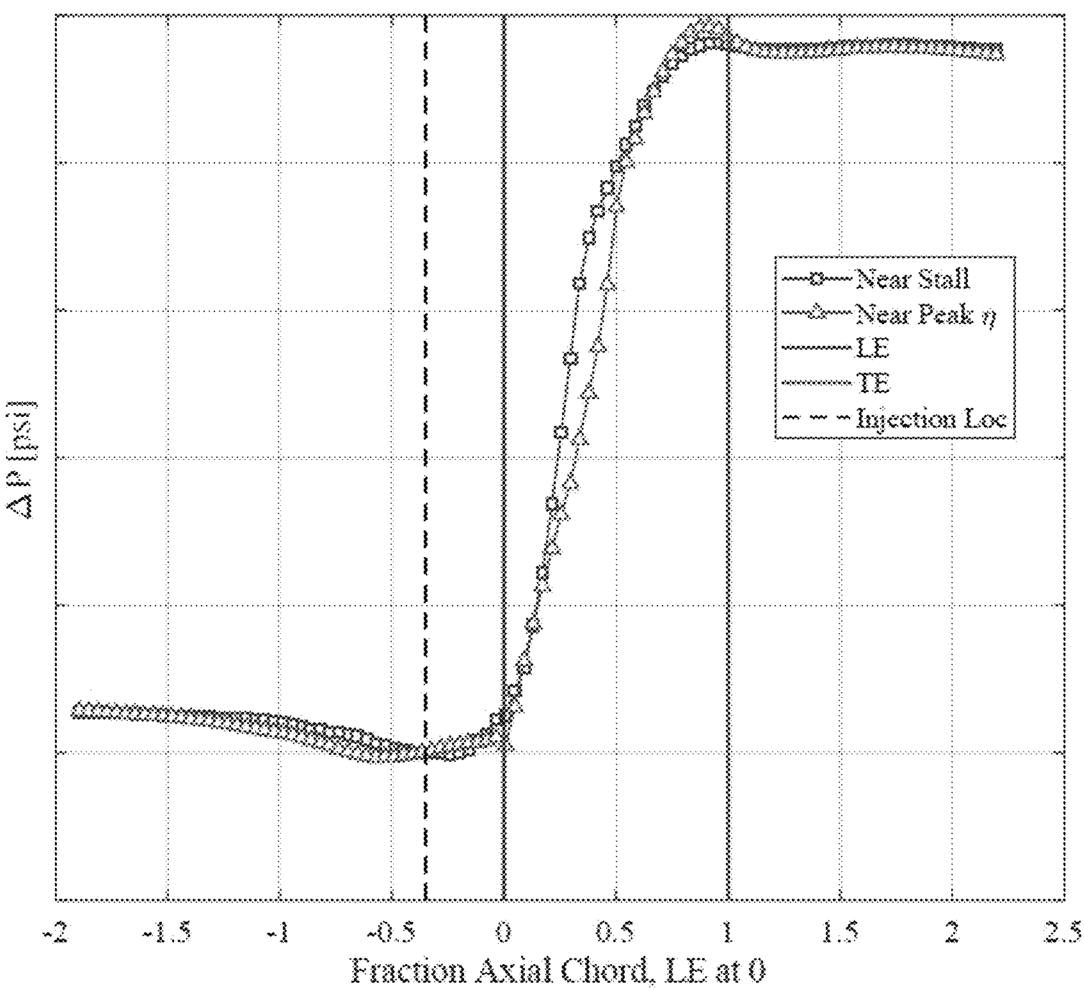
Figure 6:
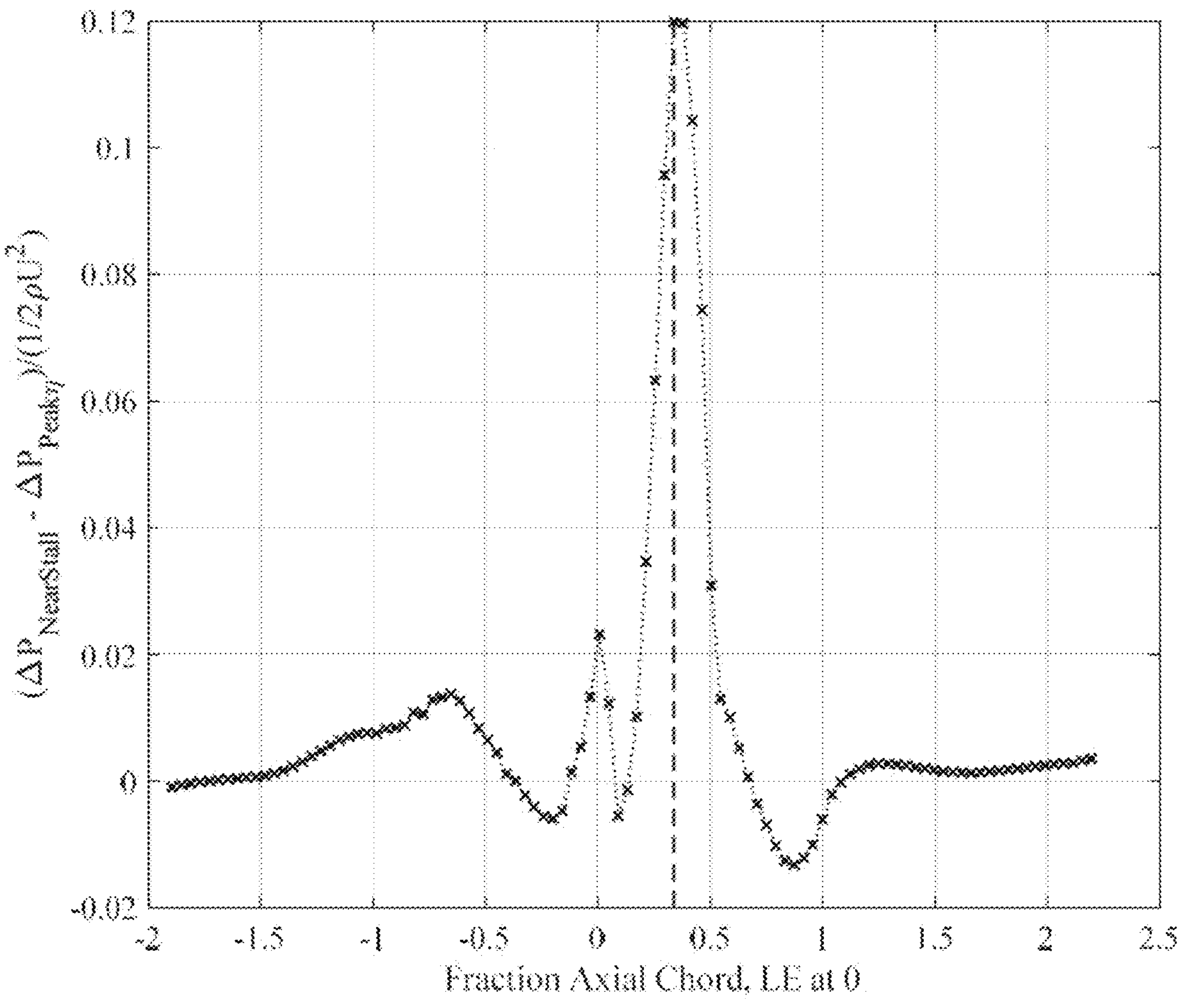
Figure 7A:
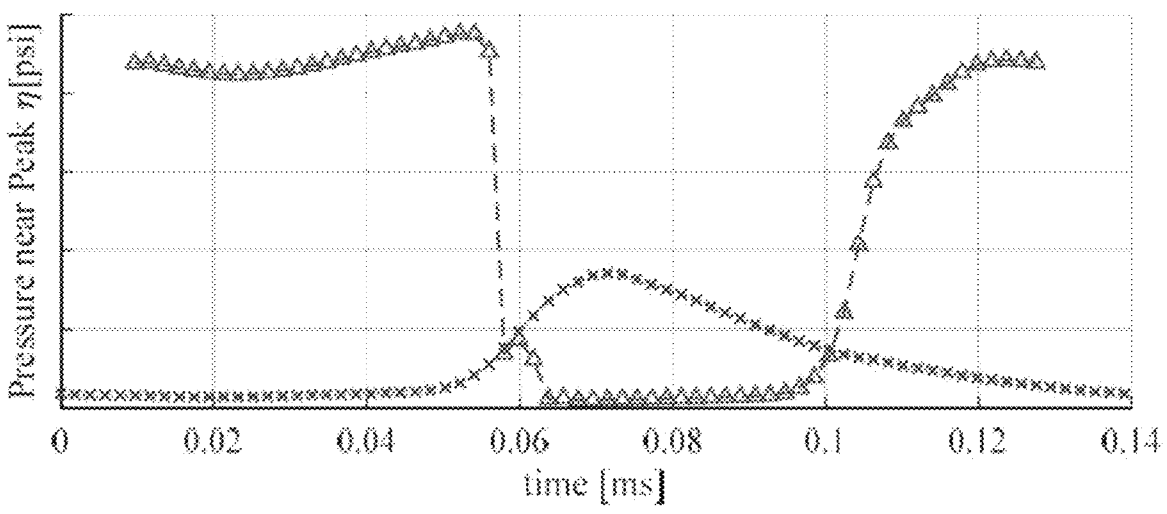
Figure 7B:
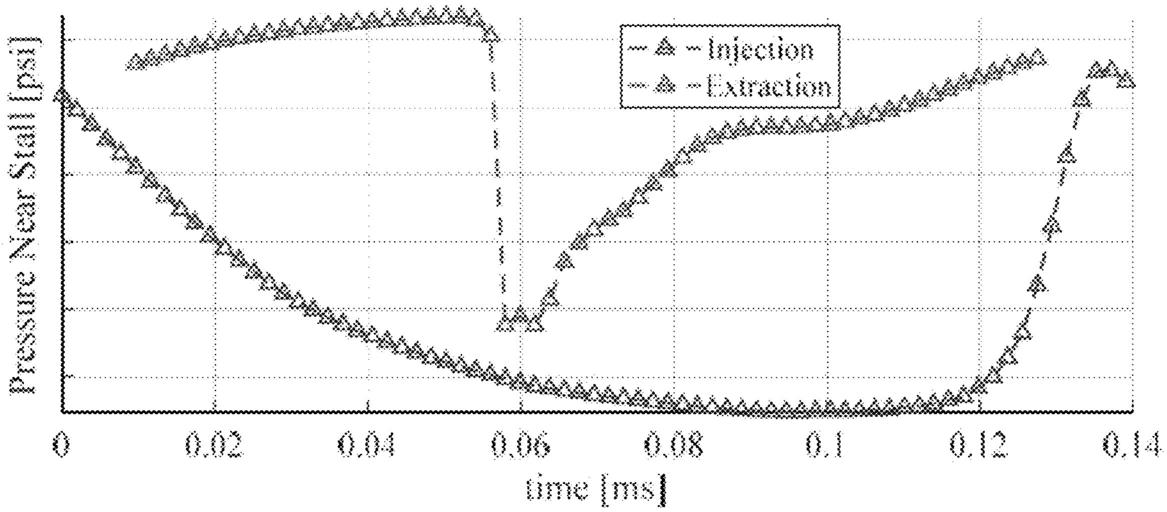
Figure 8:
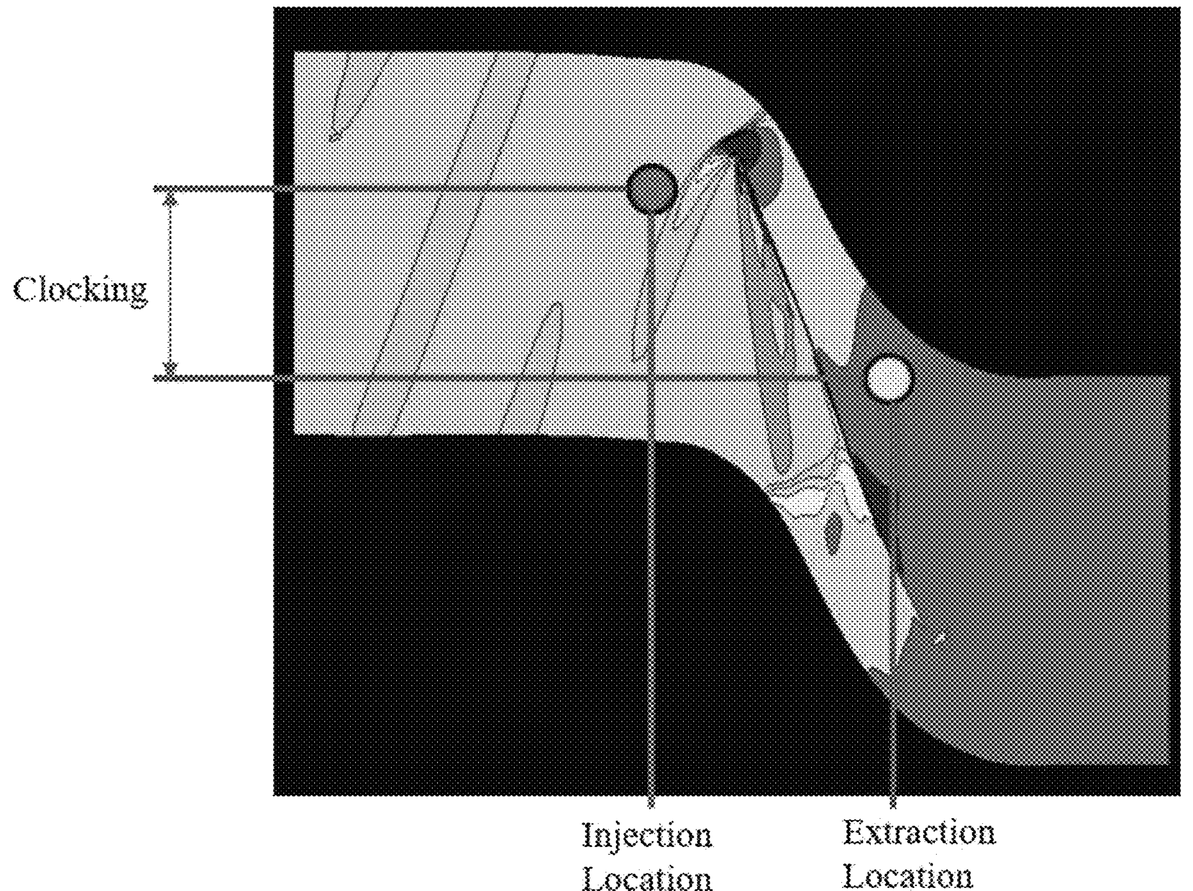
Figure 9A:
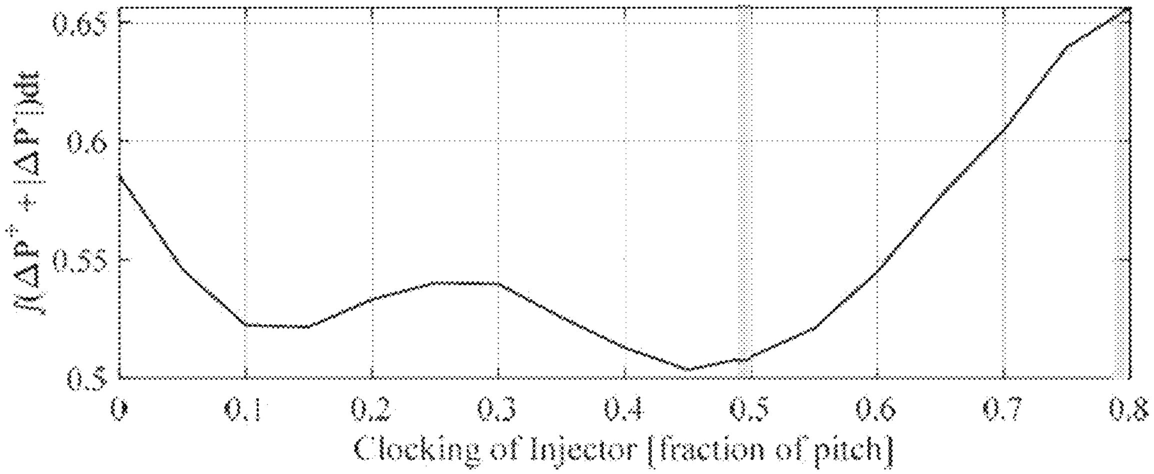
Figure 9B:
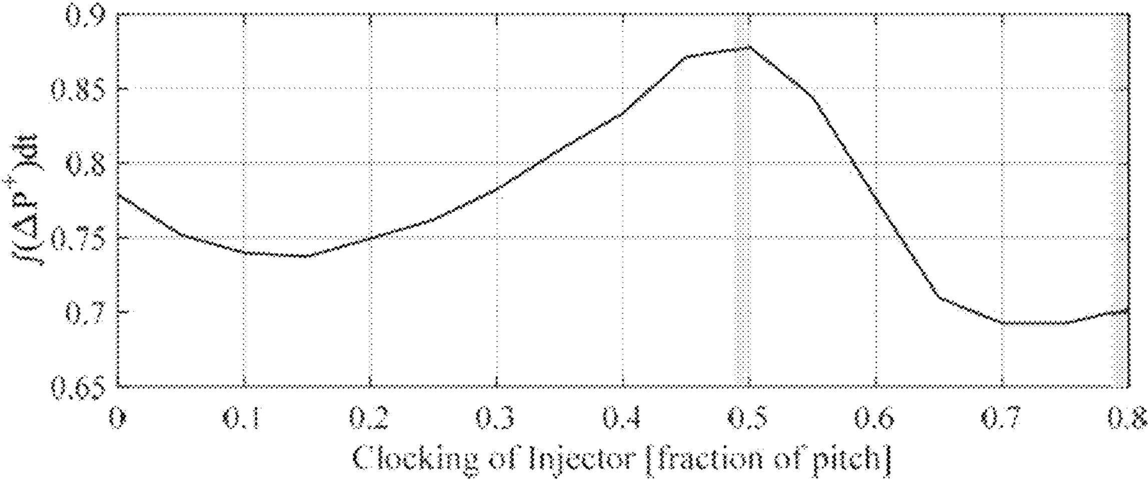
Figure 10A:
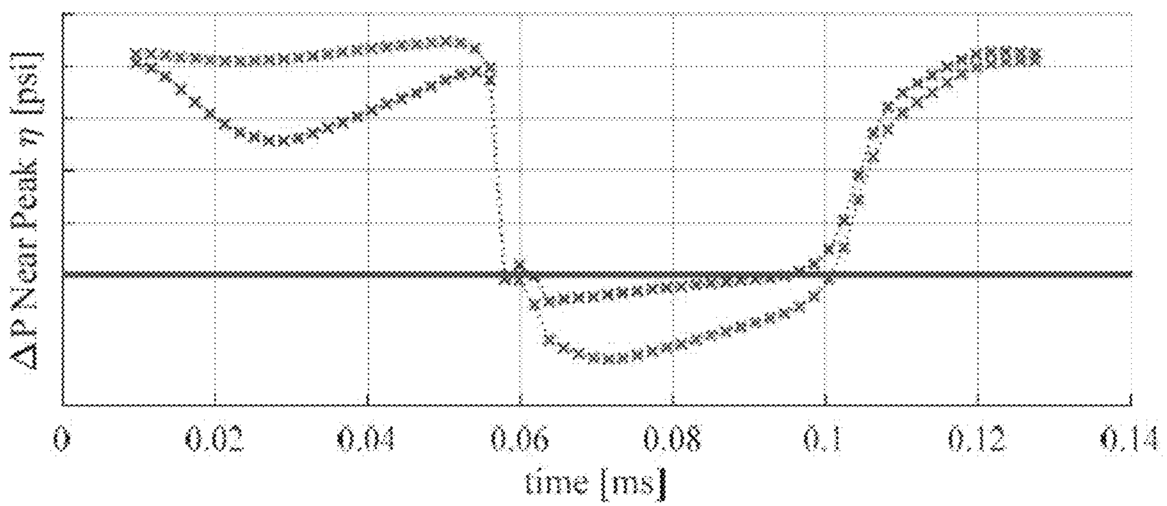
Figure 10B:
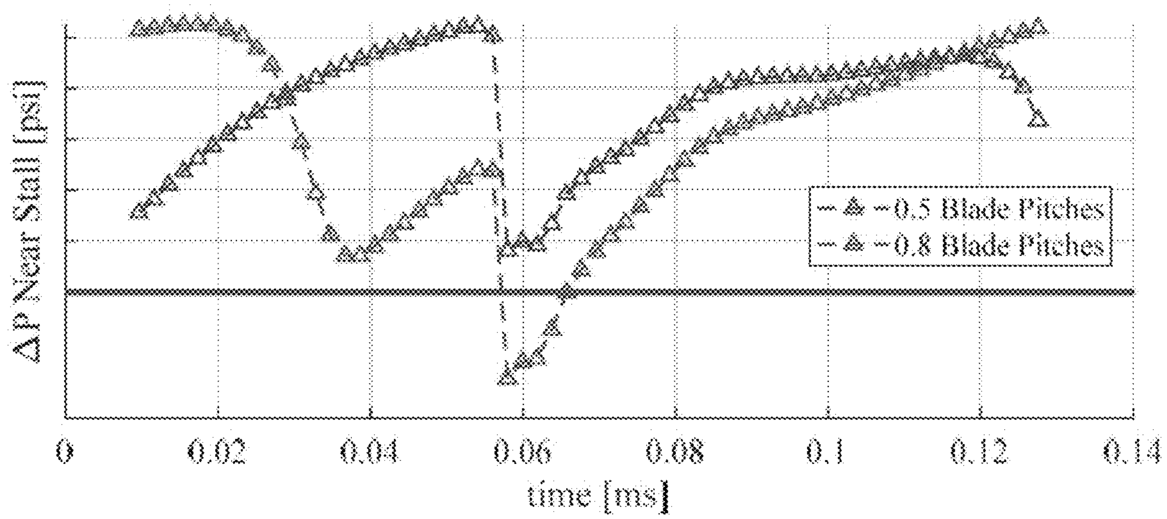
Figure 11:
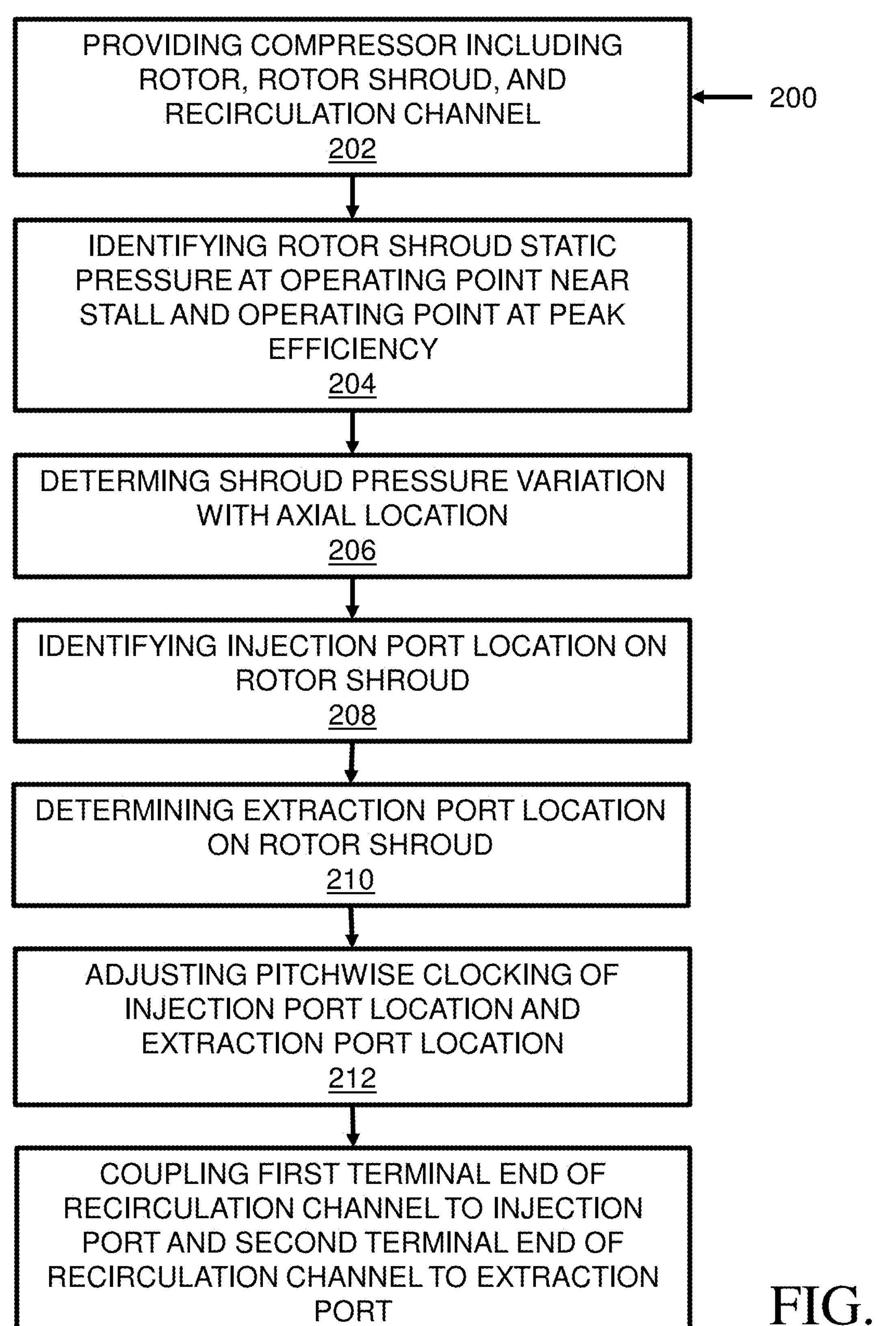
Figure 12:
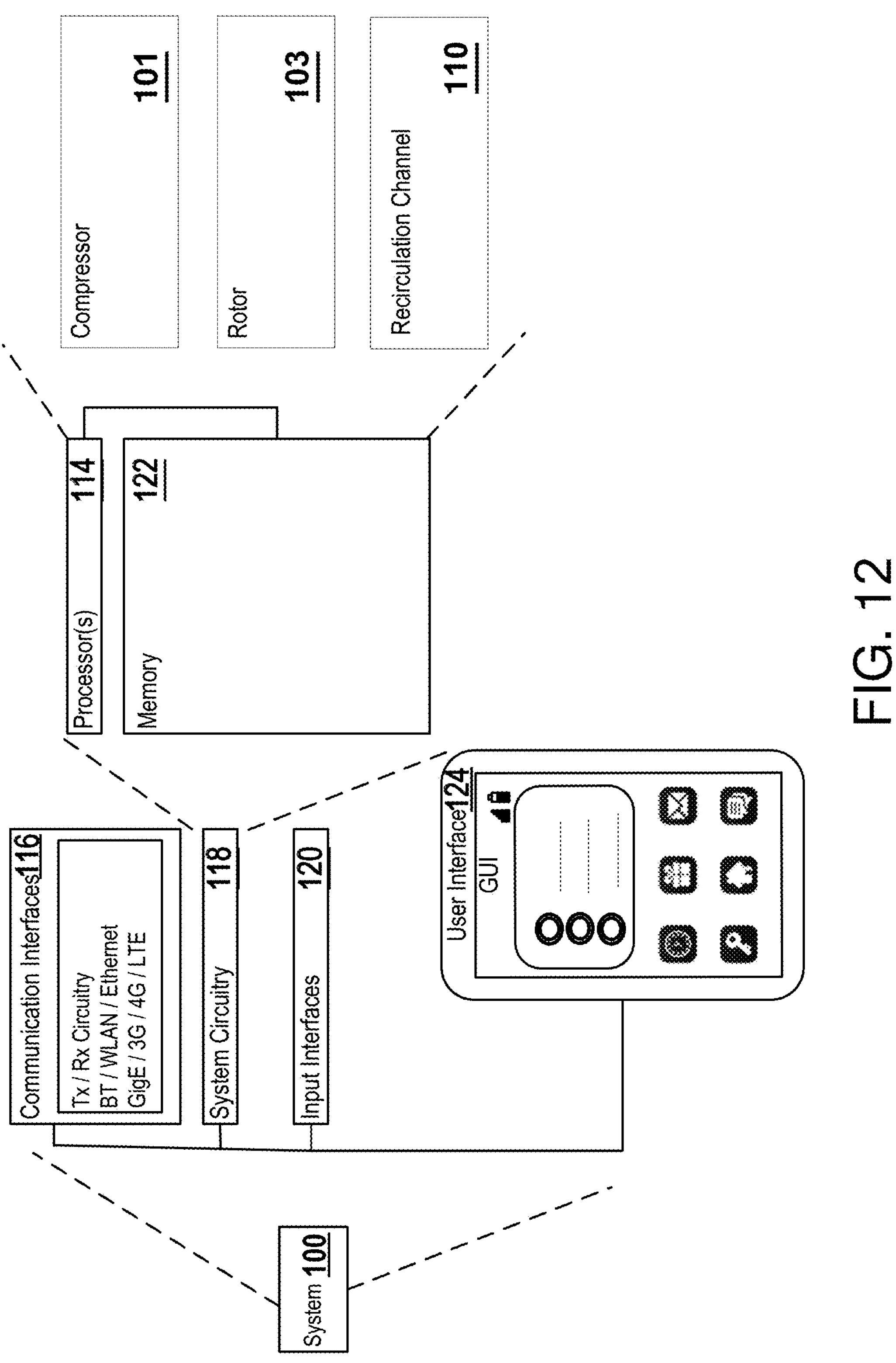
Figure 13:
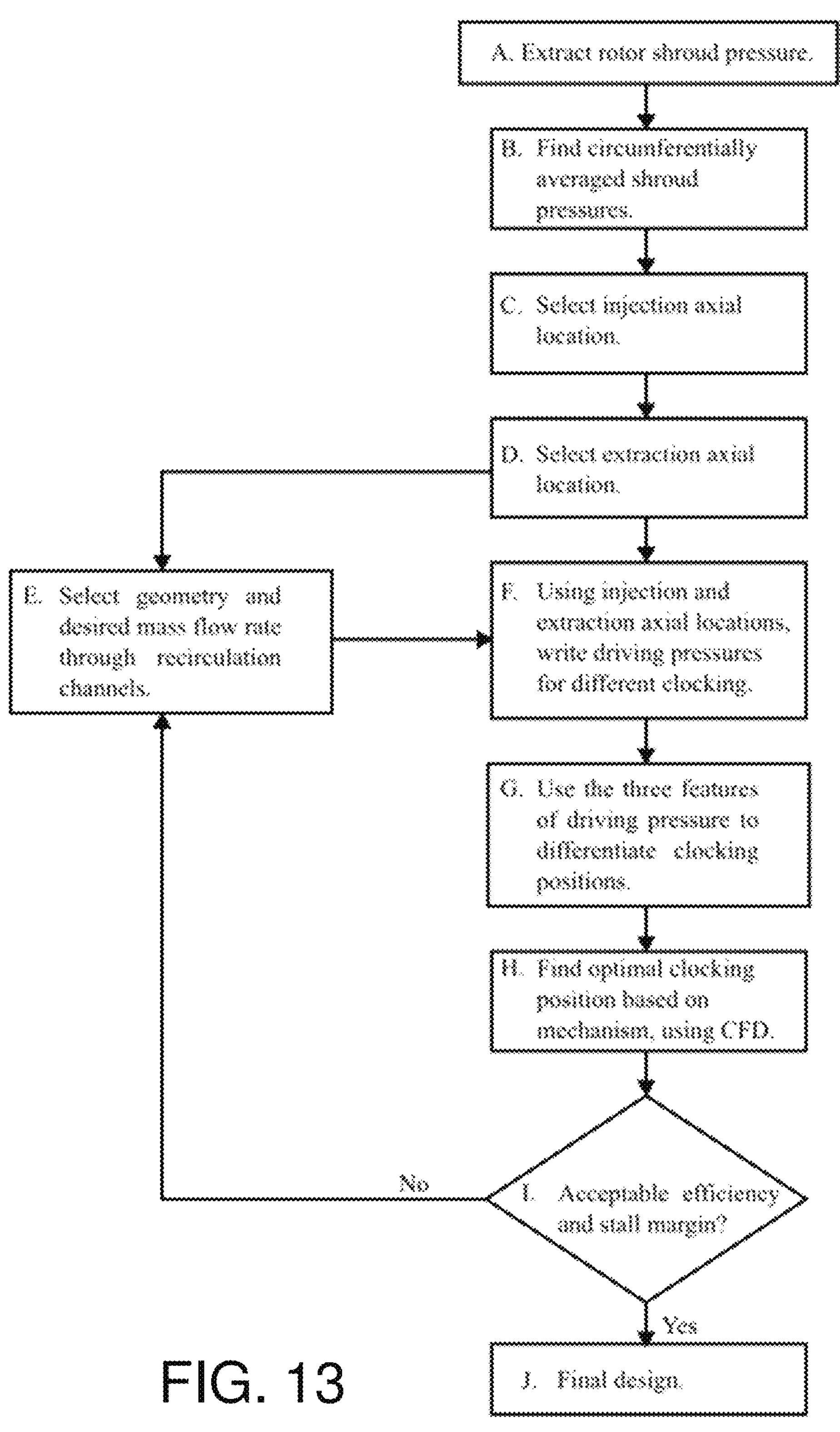
Figures 14A, 14B, 14C, 14D:
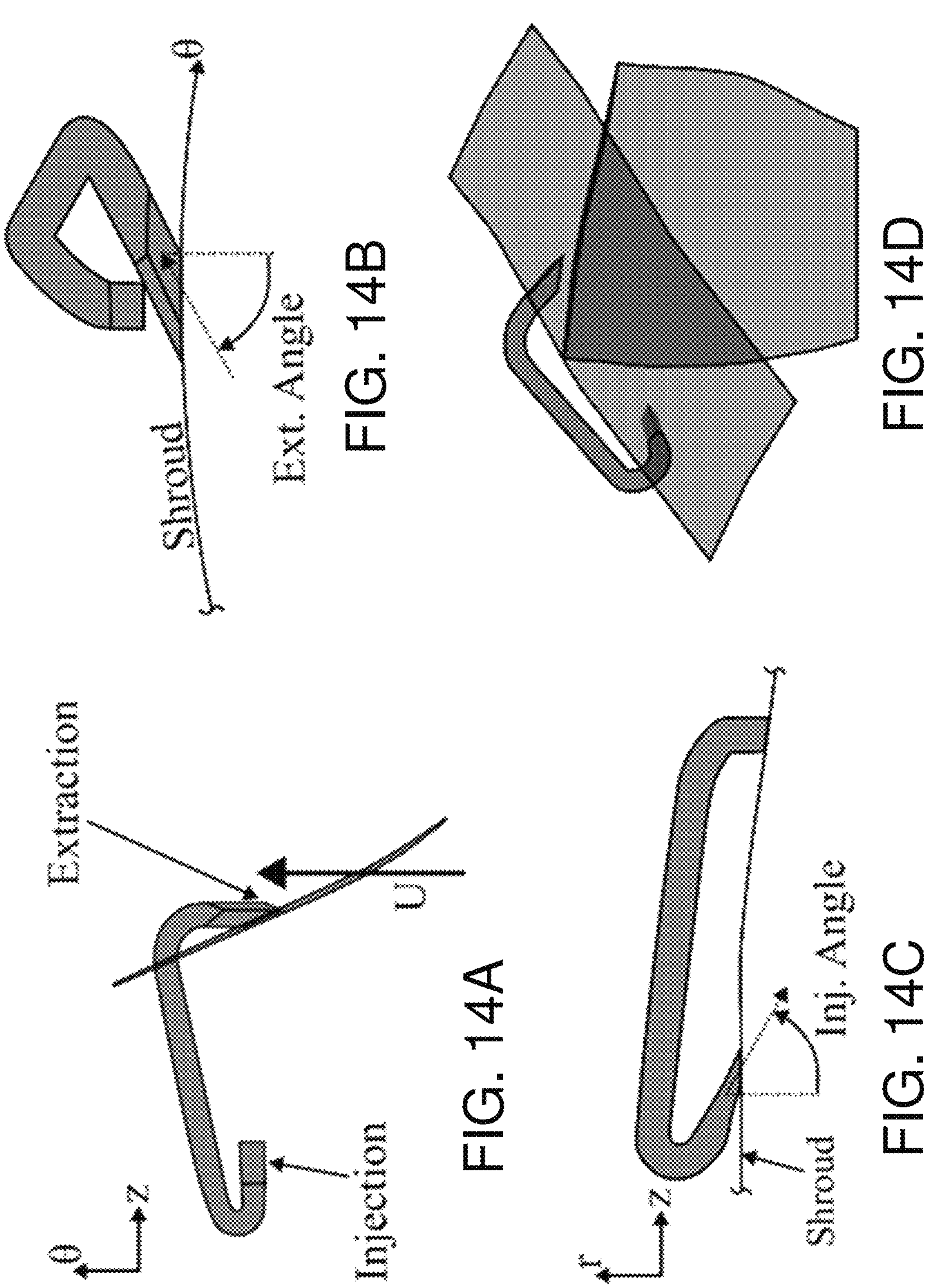
Figure 15:
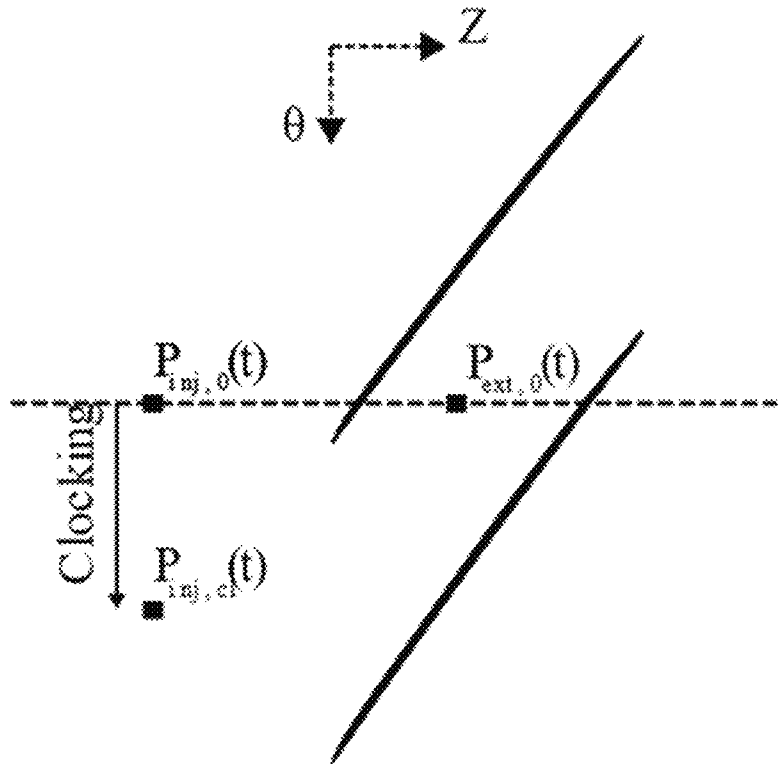

FIG. 3 is a line graph illustrating the pressure distribution at the rotor shroud, as shown in FIGS. 2A-2B, circumferentially averaged to find the variation of shroud pressure with axial location, further depicting that the pressure variation upstream of the leading edge (LE) is small; the average pressure of the injection location will not vary much based on axial location upstream of the LE, according to one embodiment of the present disclosure;

FIG. 4A is a variance line graph illustrating the circumferential shroud pressure variation plotted with the previously calculated average for peak efficiency, as shown in FIG. 3, further depicting the variation in pressure decreases further upstream, as the potential field of the rotor diminishes, according to one embodiment of the present disclosure;

FIG. 4B is a variance line graph illustrating the circumferential shroud pressure variation plotted with the previously calculated average for near stall operation, as shown in FIG. 3, further depicting the variation in pressure decreases further upstream, as the potential field of the rotor diminishes, according to one embodiment of the present disclosure;

FIG. 5 is a line graph illustrating a driving pressure of the recirculation channel as a function of extraction location; defined as ΔP between extraction location and the previously selected injection location, according to one embodiment of the present disclosure;

FIG. 6 is a line graph illustrating a non-limiting example of the normalized differences in driving pressure between peak efficiency and near stall, further depicting the best extraction location is at the peak, which is approximately ~0.35 axial chord, according to one embodiment of the present disclosure;

FIG. 7A is a line graph illustrating circumferential pressure variation at injection and extraction locations over the period of one blade passing for peak efficiency, according to one embodiment of the present disclosure;

FIG. 7B is a line graph illustrating circumferential pressure variation at injection and extraction locations over the period of one blade passing for near stall operation, according to one embodiment of the present disclosure;

FIG. 8 is a schematic diagram of pitchwise clocking between injection and extraction locations from computational fluid dynamics, according to one embodiment of the present disclosure;

FIG. 9A is a line graph illustrating the evaluation of objectives as a function of pitchwise clocking between injection and extraction angles, further depicting objective 1 at peak efficiency where the green line is at a clocking of 0.5, which is part of the first pareto front; the orange line indicates a clocking of 0.8, which is part of the last pareto front, according to one embodiment of the present disclosure;

FIG. 9B is a line graph illustrating the evaluation of objectives as a function of pitchwise clocking between injection and extraction angles, further depicting objective 2 at near stall operating point where the green line is at a clocking of 0.5, which is part of the first pareto front; the orange line indicates a clocking of 0.8, which is part of the last pareto front, according to one embodiment of the present disclosure;

FIG. 10A is a line graph illustrating a comparison of driving pressure over the period of one blade passing between "best-case" clocking of 0.5, and "worst-case" clocking of 0.8, at peak efficiency, according to one embodiment of the present disclosure;

FIG. 10B is a line graph illustrating a comparison of driving pressure over the period of one blade passing between "best-case" clocking of 0.5, and "worst-case" clocking of 0.8, at near stall operation, according to one embodiment of the present disclosure;

FIG. 11 is a flow chart depicting a method for manufacturing a casing treatment system, according to one embodiment of the present disclosure;

FIG. 12 is a schematic diagram of the casing treatment system, further depicting the system having a communication interface, an input interface, a user interface, and a system circuitry, wherein the system circuitry may include a processor and a memory, according to one embodiment of the present disclosure;

FIG. 13 is a flow chart depicting a recirculation channel design process, according to one embodiment of the present disclosure;

FIG. 14A is a schematic diagram of a casing treatment geometry, further depicting the recirculation channel from a z-θ view, according to one embodiment of the present disclosure;

FIG. 14B is a schematic diagram of a casing treatment geometry, further depicting the recirculation channel from an r-θ view, according to one embodiment of the present disclosure;

FIG. 14C is a schematic diagram of a casing treatment geometry, further depicting the recirculation channel from an r-z view, according to one embodiment of the present disclosure;

FIG. 14D is a schematic diagram of a casing treatment geometry, further depicting the recirculation channel disposed on the rotor shroud from a front elevational view, according to one embodiment of the present disclosure; and FIG. 15 is a line graph illustrating the clocking for the recirculation channel, further depicting where the positive theta direction is the direction of rotor rotation and the positive z position is the direction of the primary flow, according to one embodiment of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIG. is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The casing treatment system design is based on using the differences in the flow field at peak efficiency and near stall to "turn on" the recirculation at near stall operation to extend the stall margin, and to "turn off" the recirculation at peak efficiency operation to minimize impact to efficiency. Assuming that the recirculation flow is driven primarily by the pressure difference between the injection location and extraction location, the pressure field near the tip of the rotor at the two different operating conditions were compared. The axial locations of the injection and extraction were chosen to give a greater pressure difference for the near stall case (recirculation "turned on") whilst giving a small pressure difference for the peak efficiency case (recirculation "turned off"); this was possible due to the shock moving towards the rotor inlet plane at near stall. The injection location was chosen slightly upstream of the rotor leading edge. The circumferentially averaged pressures upstream of the rotor leading edge stayed nearly constant, and a small distance upstream was chosen; there have been studies of injection upstream distance (while keeping a constant mass flow/momentum) where an increase in distance upstream provided more mixing losses without any additional benefit. However, due to the presence of the shock in a transonic flow, the position of the injection needs to be sufficiently upstream of the shock at high loading. Once the axial location of the injection was determined, the extraction location was chosen to give the greatest pressure difference for the near stall case while giving a small pressure difference for the peak efficiency case (~35% rotor axial chord downstream of the leading edge). The injection and extraction location were chosen in an area where the pressure field had notable circumferential variation; this large variation means that it is possible for the injection location pressure to be higher than the extraction location (the recirculation channel would want to provide a bypass from the injection to the extraction location). Thus, the pitchwise clocking of the injection and extraction locations may be optimized to enhance the compressor. The first objective of the pitchwise clocking is to minimize or eliminate the fraction of time where the pressure difference between the extraction port and injection port is negative. The second objective of the pitchwise clocking is to further increase the pressure difference between the extraction and injection ports at near stall, and further decrease the pressure difference near peak efficiency. These objectives were made into cost functions, and a clocking was chosen on the pareto optimal front. One skilled in the art may select other design choices for the injection port location, the extraction port location, and/or the pitchwise clocking, within the scope of the present disclosure.

The casing treatment system 100 includes a compressor 101, which has a rotor hub 102, a rotor 103, and a rotor shroud 104 having an injection port 106, an extraction port 108, a recirculation channel 110. It is also contemplated for the casing treatment system 100 to include a plurality of injection ports 106, a plurality of extraction ports 108, and/or a plurality of recirculation channels 110. The casing treatment system 100 may be based on using the differences in the flow field at peak efficiency and near stall to "turn on" the recirculation at near stall operation to extend the stall margin, and to "turn off" the recirculation at peak efficiency operation to minimize impact to efficiency. In other words, the compressor 101 selectively engages the recirculation channel 110 at an operating point near stall and selectively disengages the recirculation channel 110 at an operating point at peak efficiency. Assuming that the recirculation flow is driven primarily by the pressure difference between the injection location and extraction location, the pressure field near a tip 112 of the rotor 103 at the two different operating conditions were compared.

The axial locations of the injection port 106 and the extraction port 108 were chosen to give a greater pressure difference for the near stall case (recirculation "turned on") whilst giving a small pressure difference for the peak efficiency case (recirculation "turned off"); this was possible due to the shock moving towards the rotor inlet plane at near stall. The injection port 106 location was chosen slightly upstream of a leading edge of the rotor 103. The circumferentially averaged pressures upstream of the leading edge of the rotor 103 stayed nearly constant, and a small distance upstream was chosen; there have been studies of injection upstream distance (while keeping a constant mass flow/momentum) where an increase in distance upstream provided more mixing losses without any additional benefit. Once the axial location of the injection port 106 was determined, the location of the extraction port 108 was chosen to give the greatest pressure difference for the near stall case while giving a small pressure difference for the peak efficiency case (~35% rotor axial chord downstream of the leading edge). One skilled in the art may select other suitable locations for the injection port 106 and/or the extraction port 108, within the scope of the present disclosure.

In certain circumstances, the location of the injection port 106 and/or the extraction port 108 were chosen in an area where the pressure field had notable circumferential variation; this large variation means that it is possible for the injection port 106 pressure to be higher than the extraction port 108 (the recirculation channel 110 would want to provide a bypass from the injection port 106 to the extraction port 108). Thus, the pitchwise clocking of the injection port 106 and the extraction port 108 may be optimized. The first objective of the pitchwise clocking is to minimize or eliminate the fraction of time where the pressure difference between the extraction port 108 and injection port 106 is negative. The second objective of the pitchwise clocking is to further increase the pressure difference between the extraction port 108 and the injection port 106 at near stall, and further decrease the pressure difference near peak efficiency. These objectives were made into cost functions, and a clocking was chosen on the pareto optimal front.

In certain circumstances, the casing treatment system 100 may provide a substantially passive casing treatment. For instance, the casing treatment system 100 may be designed so that the geometry and positioning of the recirculation channel 110 geometry may reduce the efficiency penalty of the casing treatment by "turning it off" when operating at best efficiency, and only "turning it on" when operating near stall to improve stall margin. Turning the casing treatment system 100 off refers to reducing the flow through the casing treatment system 100 significantly. This is the self-regulation property of the recirculation channel. Additionally, the design of the casing treatment system 100 may include identifying an optimal timing for the injection port 106 and the extraction port 108. For a transonic rotor flow field, there are high pressure gradients which may lead to unsteady flow in the recirculation channel 110. Accordingly, the optimized locations of the injection port 106 and the extraction port 108 may provide substantial improvements in efficiency.

To achieve these two goals, an important assumption is made: The flow through the recirculation channel is driven primarily by the pressure difference between the locations of the injection port 106 and the extraction port 108. Let this be defined as the driving pressure. The first goal of self-regulation may be achieved by considering the average driving pressure, which controls the mean flow through the recirculation channel 110 via the axial positioning of the injection port 106 and the extraction port 108. The choice of this axial positioning may reduce the mean flow through the recirculation channel 110 at best efficiency point (BEP), while increasing it at near stall operating conditions (NS). The second goal of optimized timing may be achieved by considering the time-varying driving pressure, which controls the timing of the injection and extraction flows through the circumferential positioning of the injection port 106 and the extraction port 108. The circumferential positioning of the injection port 106 and the extraction port 108 be defined as the clocking position.

In certain circumstances, the casing treatment system 100 may be provided as a processor 114. The processor 114 may be configured to input a rotor shroud pressure distribution at an operating point near stall and an operating point at peak efficiency. The processor 114 may also determine a shroud pressure variation with axial location by circumferentially averaging the rotor shroud pressure distribution at the operating point near stall and the operating point at peak efficiency. The processor 114 may also identify a location of the injection port 106 on the rotor shroud 104 by plotting the circumferential shroud pressure variation with the circumferentially averaged rotor shroud static pressure distribution. The processor 114 may identify a location of the extraction port 108 on the rotor shroud 104 by subtracting a driving pressure at the operating point at peak efficiency from a driving pressure at the operating point at near stall. The processor 114 may also adjust the pitchwise clocking of the injection port 106 and the extraction port 108 for at least one of lowering the driving pressure at the operating point at peak efficiency and raising the positive driving pressure at the operating point at near stall. In certain circumstances, the processor 114 may include a first algorithm for lowering the driving pressure at the operating point at peak efficiency. The first algorithm may include:

Minimize $\int \Delta P+dt+\int |\Delta P-|dt$ at peak efficiency operating point.

In certain circumstances, the processor 114 may include a second algorithm for raising the positive driving pressure at the operating point at near stall, the second algorithm may include:

Maximize $\int \Delta P+dt$ while keeping $\int |\Delta P-|dt=0$ at near stall operating point.

In a specific example, a pressure difference between the extraction port 108 and injection port 106 at the operating point at peak efficiency may be negative for less than around one second.

In another specific example, the processor may selectively engage the recirculation channel 110 at the operating point near stall and selectively disengages the recirculation channel 110 at the operating point at peak efficiency.

As shown in FIG. 12, the casing treatment system 100 may further include a communication interface 116, a system circuitry 118, and/or an input interface 120. The system circuitry 118 may include the processor 114 or multiple processors. The processor 114 or multiple processors execute the steps to input a rotor shroud pressure distribution at an operating point near stall and an operating point at peak efficiency, determine a shroud pressure variation with axial location by circumferentially averaging the rotor shroud pressure distribution at the operating point near stall and the operating point at peak efficiency, identify a location of the injection port 106 on the rotor shroud 104 by plotting the circumferential shroud pressure variation with the circumferentially averaged rotor shroud static pressure distribution, identify a location of the extraction port 108 on the rotor shroud by subtracting a driving pressure at the operating point at peak efficiency from a driving pressure at the operating point at near stall, and adjust the pitchwise clocking of the location of the injection port 106 and the extraction port 108 for at least one of lowering the driving pressure at the operating point at peak efficiency and raising the positive driving pressure at the operating point at near stall. Alternatively, or in addition, the system circuitry 118 may include a memory 122.

The processor 114 may be in communication with the memory 122. In some examples, as shown in FIG. 12, the processor 114 may also be in communication with additional elements, such as the communication interface 116, the input interface 120, and/or a user interface 124. Examples of the processor 114 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 114 may be one or more devices operable to execute logic. The logic may include computer executable instructions or computer code stored in the memory 122 or in other memory that when executed by the processor 114, cause the processor 114 to perform the operations of the compressor 101, the rotor 103, and/or the recirculation channel 110. The computer code may include instructions executable with the processor 114.

The memory 122 may be any device for storing and retrieving data or any combination thereof. The memory 122 may include non-volatile and/or volatile memory, such as a random-access memory (RAM), a read-only memory (ROM), an erasable programmable read-only memory (EPROM), or flash memory. Alternatively or in addition, the memory 122 may include an optical, magnetic (hard-drive), solid-state drive or any other form of data storage device. The memory 122 may be included in any component or sub-component of the system 100 described herein.

The user interface 124 may include any interface for displaying graphical information. The system circuitry 118 and/or the communications interface(s) 114 may communicate signals or commands to the user interface 124 that cause the user interface to display graphical information. Alternatively or in addition, the user interface 124 may be remote to the system 100 and the system circuitry 118 and/or communication interface(s) 114 may communicate instructions, such as HTML, to the user interface to cause the user interface to display, compile, and/or render information content. In some examples, the content displayed by the user interface 124 may be interactive or responsive to user input. For example, the user interface 124 may communicate signals, messages, and/or information back to the communications interface 114 or system circuitry 118.

The system 100 may be implemented in many different ways. In some examples, the system 100 may be implemented with one or more logical components. For example, the logical components of the system 100 may be hardware or a combination of hardware and software. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 122, for example, that comprises instructions executable with the processor 114 or other processor to implement one or more of the features of the logical components. When any one of the logical components includes the portion of the memory that comprises instructions executable with the processor 114, the component may or may not include the processor 114. In some examples, each logical component may just be the portion of the memory 122 or other physical memory that comprises instructions executable with the processor 114, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks and flash memory drives. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor 114 or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor 114 may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

In certain circumstances, the geometry of the casing treatment system 100 may be adjusted to optimize a mass flow rate through the recirculation channel 110, as shown in FIGS. 14A-14D. For instance, the angle of injection port 106 may be shaped to allow flow injection along the shroud 103 and allow flow alignment. The angle of the extraction port 108 may be shaped to ingest flow in the direction of rotation with a radial outward component. The circumferential component of the rotor flow field may be the most reliable contributor to extracted flow. It is recommended to check flow angles near the shroud 103 before designing an extraction channel to uptake reversed axial flow or forward axial flow.

Figure 1:
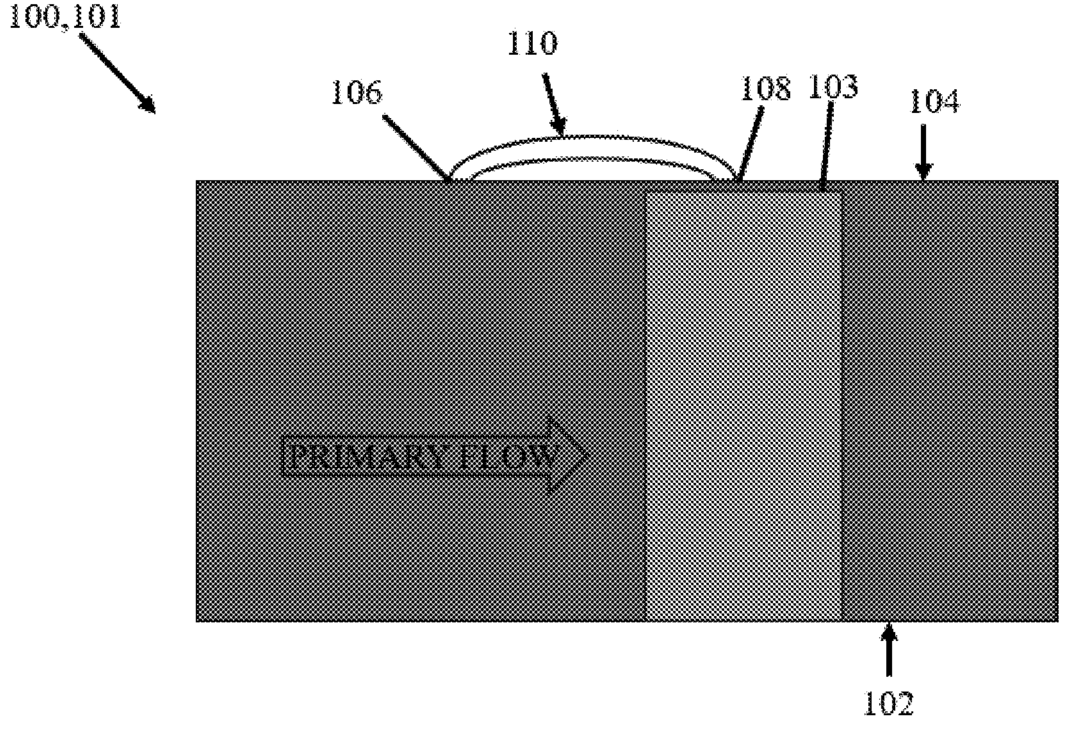
FIG. 1 is a schematic diagram of a casing treatment system, further depicting the flow through a recirculation channel which is assumed to be driven by the pressure difference between the extraction and injection locations of the recirculation channel, according to one embodiment of the present disclosure.

The casing treatment system 100 may be provided in various ways. For instance, the casing treatment system 100 may be provided according to a method 200. The method 200 may include a step 204 of identifying a rotor shroud static pressure distribution. In a specific example, the flow through a recirculation channel 110, as shown in FIG. 1, is assumed to be driven by the pressure difference between the extraction port 108 and the injection port 106 locations of the recirculation channel 110. From computational fluid dynamics (CFD), or experimental results, extract the rotor shroud pressure distribution at an operating point near stall and an operating point at peak efficiency, as shown in FIG. 2. More specifically, the rotor shroud static pressure distribution may be extracted at two operating points: (1) the best efficiency point (BEP), and (2) an operating point near stall (NS). Pressure will be a function of circumferential and axial position (θ,z), time (t), and operating point (OP), as shown below.

$$P = f(\theta, z, t, OP)$$

An example of this static pressure distribution is shown in FIGS. 2A-2B. This pressure distribution may be equivalent to the ensemble average over one blade passing (1BP).

The method may further include a step 206 of identifying a shroud pressure variation with axial location. In a specific example, the pressure distribution is circumferentially averaged to find the variation of shroud pressure with axial location. In another specific example, the circumferential average may be found for both best efficiency point (BEP) and near stall (NS). It is observed that the pressure variation upstream of the leading edge (LE) is small; the average pressure of the injection location will not vary much based on axial location upstream of the LE, as shown in FIG. 3.

Next, the method 200 may further include a step 208 of identifying an injection location. To choose an injection location, the circumferential shroud pressure variation may be plotted with the previously calculated average, as shown in FIGS. 4A-4B. It should be appreciated that the variation in pressure decreases further upstream, as the potential field of the rotor diminishes. The circumferentially averaged pressure upstream of the rotor does not vary much with distance upstream; however, the circumferential variation increases greatly with increased loading as the bow shock becomes stronger and the passage shock becomes detached at the rotor tip. An injection location upstream of the leading edge, but close to the leading edge may be desirable for decreasing mixing losses. Additionally, the closer the location of the injection port 106 is to the rotor 103, the more localized the effect of injection will be. This may mean that the design will have less tolerance for error in injection angle, desired mass flow, and optimal clocking. However, having a closer injection port 106 location may also reduce the efficiency penalty, and may also reduce how much flow is re-worked due to the recirculation channel 110. An injection port 106 location further from the rotor 103 implies greater mixing before the injected flow reaches the rotor 103, and thus this design will have a greater tolerance for inexact optimization. Less iterations are needed to create a design that can extend stall margin. However, the injection port 106 location also cannot be too far upstream, as the benefits of clocking will be lost (the flow is too mixed out), and the efficiency penalty will be greater. Due to the presence of the shock system, a minimum distance upstream of the rotor is required for the injected flow to effectively energize the blockage (i.e. the injection port 106 has to be in-front of the shock for a sufficient portion of time). This injection location should also have notable pressure variation, such that the casing treatment system 100 pitchwise clocking method can be used. For the example, as shown in FIGS. 4A-4B, an injection location of −0.35 axial chord was selected. A conservative estimate that may allow stall margin extension with small losses efficiency is an injection port 106 axial location of around one axial chord or less upstream from the leading edge LE of the rotor 103. A skilled artisan may select other suitable ranges for the location of the injection port 106, within the scope of the present disclosure.

Afterwards, the method 200 may include a step 210 of determining an extraction port 108 location. For both operating conditions (BEP and NS), the driving pressure of the recirculation channel 110 may be found as a function of extraction port 108 location by subtracting the circumferentially averaged pressure at all axial locations by the circumferentially averaged pressure at the chosen injection port 106 location. An example of this is shown in FIG. 5. Then, the driving pressure at the near peak efficiency point may be subtracted from the driving pressure at the near stall operating point as shown in FIG. 6. The location with the greatest difference (peak of FIG. 6) may allow the recirculation channel 110 to "turn off" at peak efficiency, and "turn on" near stall, to minimize impact to efficiency at peak efficiency operating point. To note, the average driving pressure may determine the average flow through the recirculation channel 110. The extraction port 108 axial location may be moved downstream slightly to increase the average driving pressure and thus increase the flow through the recirculation channel 110, or slightly upstream to decrease the average driving pressure and thus decrease the flow through the recirculation channel 110. One skilled in the art may select other suitable ways for the determining the extraction port 108 location, within the scope of the present disclosure. Next, the method 200 may further include a step 212 of adjusting the pitchwise clocking of the injection port 106 and extraction port 108 locations. Although the average driving pressures are now set by the axial injection port 106 and extraction port 108 locations, the difference in driving pressures at the two loadings can be further increased using circumferential positioning (clocking), as the pressure field distribution changes with the passage shock moving forward with increased loading. The clocking for the recirculation channel 110 may be show in FIG. 15, where the positive theta direction is the direction of rotor rotation, and the positive z position is the direction of the primary flow. More specifically, three features of driving pressure may be utilized to differentiate clocking positions. (1) The time at which the bulk of the flow extraction happens, relative to the rotor position, may be found. (2) The time at which the bulk of the injection flow reaches the rotor leading edge LE, relative to the rotor position, may be estimated by additionally estimating a time of convection from the injection port 106 to the rotor leading edge LE. (3) The difference between the time-varying pressure at the injection port 106 and the time-varying pressure at the extraction port 108 may be found to give a measure of flow compression and expansion within the recirculation channel 110. These three features, as referenced in FIG. 13, may be defined as the signature of the clocking configuration, as distinct clocking configurations may be identified through the uniqueness of these three properties. Reduce the set of physical clocking configurations by only keeping one of each distinct clocking signature. Note that if the location of the injection port 106 is one chord or more upstream, it may be likely that feature 1 (time of bulk extraction) is the same for all clocking configurations. In this case, prioritize selecting unique values of feature 2 (time of bulk injection), and then choose configurations with larger variations of feature 3 (more compression and expansion within recirculation channel) over smaller ones. One skilled in the art may select other features to adjust the pitchwise clocking of the injection port 106 and the extraction port 108, within the scope of the present disclosure.

To find the time varying driving pressure $\Delta P(t)$: The propagation time of a pressure wave through the recirculation channel 110 may be estimated based on the expected length of the channel 110 and the approximate temperature and mass flow through the channel 110; this propagation time can then be used to calculate an effective clocking and corresponding time-varying driving pressure. Since this estimate of driving pressure comes from a flow field without casing treatment, it is assumed that the driving pressure will not be significantly changed by the recirculated flow. This assumption is not unreasonable at very small casing treatment mass flows (i.e. less than around 0.5% of inlet mass flow).

The circumferential pressure variation at the injection port 106 and extraction port 108 locations may be identified, as shown in FIG. 7. From this distribution, it can be seen in FIG. 8 that the pitchwise clocking of the injection port 106 and extraction port 108 locations can be further optimized for the following objectives:

(1) To have the lowest driving pressure for the shortest period of time at peak efficiency operating point (i.e., recirculation channel 110 is turned off). This objective is translated into: "Minimize $\int \Delta P^{+}dt+\int|\Delta P^{-}|dt$ at peak efficiency operating point";

(2) To have the largest positive driving pressure for the longest time at near stall (i.e., recirculation channel 110 is turned on). This objective is translated into: "Maximize $\int \Delta P^{+}dt$ while keeping $\int|\Delta P^{-}|dt=0$ at near stall operating point".

These two clocking objectives are plotted in FIGS. 9A and 9B. It should be appreciated that the clocking is defined in fractions of a rotor pitch. The green line is at a clocking of 0.5, which is part of the first pareto front; the orange line indicates a clocking of 0.8, which is part of the last pareto front. A comparison between these two clockings are made in FIG. 10. Note that the optimal clocking (clocking of 0.5 pitches between the injection and extraction locations) minimized the time that the recirculation channel 110 spent with a negative driving pressure at near peak efficiency (negative driving pressure will tend to allow flow to bypass part of the rotor passage, which is undesirable). The total pressure variation at peak efficiency is also minimized slightly by the clocking, allowing the recirculation channel 110 to be less active at this operating point. The optimal clocking also increased the driving pressure (and hence the flow through the recirculation channel 110) at near stall and eliminated negative driving pressure at this operating point.

Note that the above optimization is based on improving the recirculation channel's 110 self-regulating characteristics; another way to optimize clocking is in the control of the timing of the injected and extracted flows, such that the flow occurs to target blockage. One skilled in the art may select other suitable ways to optimize the clocking, within the scope of the present disclosure.

In certain circumstances, the method 200 may also include a step 114 of coupling a first terminal end of the recirculation channel 110 to the injection port 106 and a second terminal end of the recirculation channel 110 to the extraction port 108.

Advantageously, the casing treatment system 100 and method 200 may select and/or adjust the pitchwise clocking of the injection and extraction locations to further optimize the effectiveness of the stall margin of the casing treatment while negligibly impacting the efficiency of the compressor 101.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A method of designing a casing treatment system for a compressor, the method comprising the steps of:

providing a compressor to be configured including a rotor having a leading edge, and a rotor shroud disposed at least partially over the rotor;

using one or more processors to obtain rotor shroud static pressure distribution data for the compressor at an operating point near stall and an operating point at peak efficiency, wherein the pressure distribution data includes shroud static pressure as a function of circumferential position and axial position on the rotor shroud;

determining, from the obtained pressure distribution data, a shroud pressure variation with axial location for at least one of the operating point near stall and the operating point at peak efficiency;

selecting an injection port location on the rotor shroud based on the shroud pressure variation with axial location;

selecting an extraction port location on the rotor shroud based on a driving pressure defined between the extraction port location and the selected injection port location;

selecting a pitchwise clocking between the selected injection port location and the selected extraction port location, wherein the pitchwise clocking is defined as the circumferential offset of the injection port location relative to the extraction port location expressed as a fraction of a rotor blade pitch; and generating a design specification that specifies an injection port at the selected injection port location, an extraction port at the selected extraction port location, and a recirculation channel fluidly coupling the injection port to the extraction port in accordance with the selected pitchwise clocking.

2. The method of claim 1, wherein the step of determining the shroud pressure variation with axial location includes circumferentially averaging the rotor shroud static pressure distribution data.

3. The method of claim 2, wherein the step of selecting the injection port location includes plotting the circumferential shroud pressure variation with the circumferentially averaged rotor shroud static pressure distribution data.

4. The method of claim 1, wherein the selected injection port location is upstream of a leading edge of the rotor.

5. The method of claim 1, wherein the step of selecting the extraction port location includes subtracting the circumferentially averaged pressure at all axial locations from the circumferentially averaged pressure at the selected injection port location.

6. The method of claim 5, wherein the step of selecting the extraction port location further includes subtracting a driving pressure at the operating point at peak efficiency from a driving pressure at the operating point near stall.

7. The method of claim 1, wherein the step of selecting the pitchwise clocking includes selecting the pitchwise clocking to reduce a duration during which the driving pressure is negative at the operating point at peak efficiency.

8. The method of claim 1, wherein the step of selecting the pitchwise clocking includes selecting the pitchwise clocking to increase a positive driving pressure at the operating point near stall while maintaining the driving pressure non-negative at the operating point near stall.

9. The method of claim 1, further comprising, forming the injection port in the rotor shroud at the selected injection port location and the extraction port in the rotor shroud at the selected extraction port location, based on the design specification.

10. The method of claim 9, further comprising, installing the recirculation channel to fluidly couple the injection port to the extraction port in accordance with the selected pitchwise clocking.

11. The method of claim 1, wherein obtaining the rotor shroud static pressure distribution data includes executing a computational fluid dynamics (CFD) simulation of the compressor to be configured at the operating point near stall and at the operating point at peak efficiency.

12. The method of claim 1, wherein obtaining the rotor shroud static pressure distribution data includes receiving pressure measurements from a plurality of pressure sensors disposed at least one of one the rotor shroud and in the rotor shroud.

13. The method of claim 1, wherein determining the shroud pressure variation with axial location includes determining a circumferentially averaged shroud pressure as a function of axial position.

14. The method of claim 1, wherein selecting the injection port location includes selecting a location upstream of the rotor leading edge at which the circumferentially averaged shroud pressure varies by less than a threshold over a predetermined upstream axial distance.

15. The method of claim 1, wherein selecting the extraction port location includes selecting an axial location that increases a difference between (i) a driving pressure at the operating point near stall and (ii) a driving pressure at the operating point at peak efficiency.

16. The method of claim 1, wherein selecting the pitchwise clocking includes evaluating a plurality of candidate pitchwise clockings and selecting a candidate based on at least two objectives including (i) reduced negative driving pressure at peak efficiency and (ii) increased positive driving pressure near stall.

17. The method of claim 16, wherein selecting the candidate includes selecting a candidate on a Pareto front of the at least two objectives.

18. The method of claim 1, wherein generating the design specification includes specifying an injection port angle configured to inject flow along the rotor shroud and specifying an extraction port angle configured to ingest flow with a circumferential component in a direction of rotor rotation.

19. The method of claim 1, wherein generating the design specification includes specifying a plurality of injection ports and a plurality of extraction ports circumferentially distributed about the rotor shroud and fluidly coupled by a plurality of recirculation channels.

* * * * *